United States Patent [19]

Bateman

[11] Patent Number: 5,593,201
[45] Date of Patent: Jan. 14, 1997

[54] TRUCK TOOL ORGANIZER SYSTEM

[76] Inventor: Nick Bateman, 1620 Bowling La., San Jose, Calif. 95118

[21] Appl. No.: 596,740

[22] Filed: Feb. 5, 1996

[51] Int. Cl.⁶ ..................................................... B60P 7/02
[52] U.S. Cl. ......................... 296/100; 296/24.1; 296/37.6
[58] Field of Search .......................... 296/24.1, 26, 37.6, 296/100

[56] References Cited

U.S. PATENT DOCUMENTS

| | | | |
|---|---|---|---|
| 3,664,704 | 5/1972 | Ellis | 296/24.1 |
| 3,727,971 | 4/1973 | Sisler | 296/37.6 |
| 3,826,529 | 7/1974 | Wood | 296/37.6 |
| 4,378,127 | 3/1983 | Rossi, Sr. | 296/37.6 X |
| 4,705,317 | 11/1987 | Henri | 296/37.6 |
| 4,733,898 | 3/1988 | Williams | 296/37.6 X |
| 4,789,195 | 12/1988 | Fletcher | 296/37.6 |
| 5,513,941 | 5/1996 | Kulas et al. | 296/26 X |

*Primary Examiner*—Dennis H. Pedder

[57] ABSTRACT

A truck tool organizer system including a truck bed cover that has a top planar portion with a pair of side projections, a front wall, a rear door and a pair of side walls. The rear door has a window centrally positioned therein and a turn handle that extends from a bottom end of the door. Each side wall has a window positioned within. Included is a bottom shell that is positioned within a truck bed and adjacent a pair of wheel wells. The shell has an interior bottom with a pair of front casters attached. The shell receives a slidable drawer. Lastly, included is a center unit. The center unit is positioned in the truck bed and has a floor portion with a pair of tool bins. Each tool bin is positioned above the wheel well of the truck bed with the floor portion as a tool bin base.

1 Claim, 5 Drawing Sheets

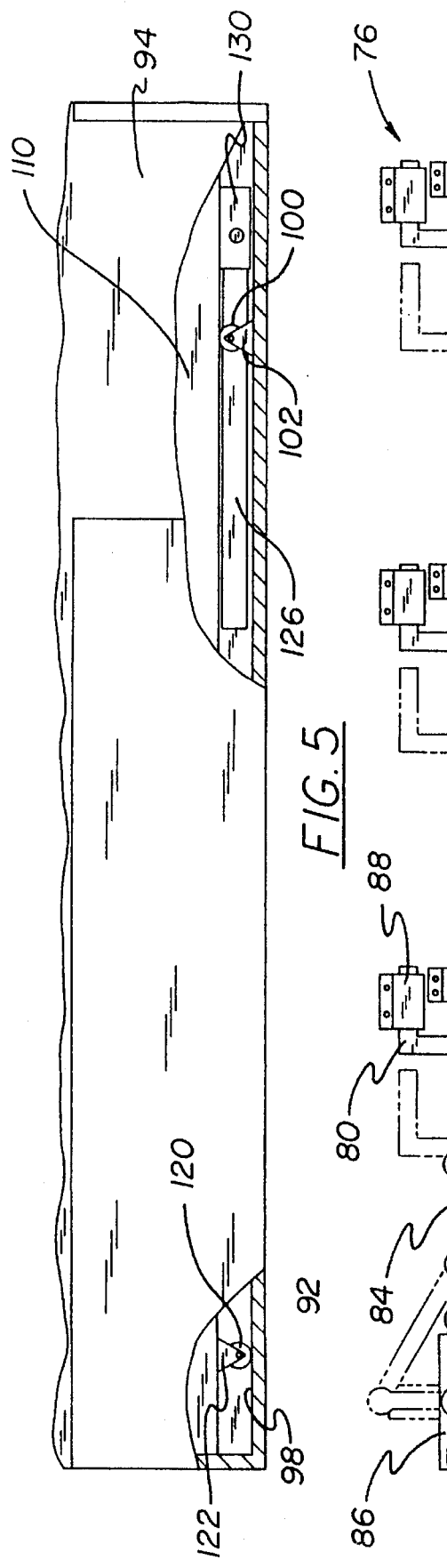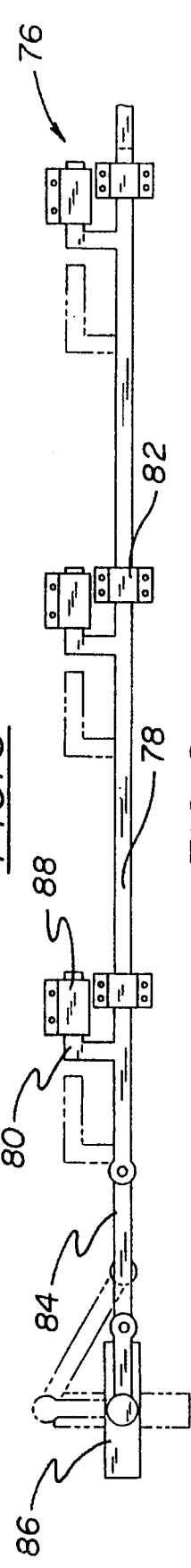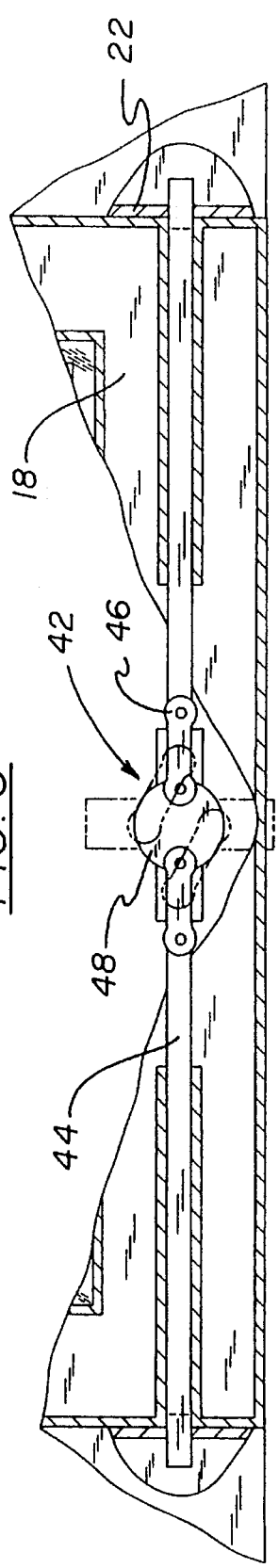

5,593,201

TRUCK TOOL ORGANIZER SYSTEM

BACKGROUND OF THE INVENTION

1. Field of the Invention

The present invention relates to a truck tool organizer system and more particularly pertains to allowing a person in the construction business to transport and store tools in an organized fashion in the truck of a pickup truck, and further allowing the person to transport materials used in the building process on the truck bed cover.

2. Description of the Prior Art

The use of truck bed tool box is known in the prior art. More specifically, truck bed tool box heretofore devised and utilized for the purpose of tool storing are known to consist basically of familiar, expected, and obvious structural configurations, notwithstanding the myriad of designs encompassed by the crowded prior art which has been developed for the fulfillment of countless objectives and requirements.

By way of example, U.S. Pat. No. Des. 349,680 to Powell discloses a truck bed tool box. U.S. Pat. No. 5,232,529 to Booker discloses a truck bed air deflating tool box. U.S. Pat. No. 4,915,437 to Cherry discloses a toll tray. U.S. Pat. No. 4,789,195 to Fletcher discloses a truck tool box. U.S. Pat. No. 4,705,317 to Henri discloses a container for truck platforms. Lastly, U.S. Pat. No. 4,573,731 to Knaack and Weger, Jr. discloses a vehicle storage drawer unit.

While these devices fulfill their respective, particular objectives and requirements, the aforementioned patents do not describe truck tool organizer system that allows a truck bed cover to be provided with a bottom shell and a central unit to provide a tool organizer, storage area, and material transporter in a single system that can be placed in a truck bed of a pickup truck for use by a person in construction.

In this respect, the truck tool organizer system according to the present invention substantially departs from the conventional concepts and designs of the prior art, and in doing so provides an apparatus primarily developed for the purpose of allowing a person in the construction business to transport and store tools in an organized fashion in the truck of a pickup truck, and further allowing the person to transport materials used in the building process on the truck bed cover.

Therefore, it can be appreciated that there exists a continuing need for a new and improved truck tool organizer system which can be used for allowing a person in the construction business to transport and store tools in an organized fashion in the truck of a pickup truck, and further allowing the person to transport materials used in the building process on the truck bed cover. In this regard, the present invention substantially fulfills this need.

SUMMARY OF THE INVENTION

In view of the foregoing disadvantages inherent in the known types of truck bed tool box now present in the prior art, the present invention provides an improved truck tool organizer system. As such, the general purpose of the present invention, which will be described subsequently in greater detail, is to provide a new and improved truck tool organizer system and method which has all the advantages of the prior art and none of the disadvantages.

To attain this, the present invention essentially comprises a generally rectangular truck bed covering. The truck bed covering has a top planar portion, a front wall, a rear door, and a pair of side walls. The top planar portion has a pair of side projections that extend upwardly from the side walls of the truck bed cover. The planar portion is capable of carrying elongated planks thereon. The front wall has a window. The rear door has a door centrally positioned therein and a turn handle. The turn handle extends from a bottom end of the door. The door has a pair of lift handles that are propornately spaced along the bottom end. The door may be opened by lifting up on the lift handles. The door remains in the open position with a hydraulic mechanism attached to an interior side of the door and cover. Each side wall has a window positioned therein. Each window of each side wall has a three lift handles for opening, and a support rod for holding the window in the open position. Included is a generally rectangular bottom shell. The bottom shell is positioned within a truck bed adjacent a pair of wheel wells. Each wheel well extends upwardly a distance into the truck bed. The shell has a height equal to the distance each wheel well extends upward into the truck bed. The shell has a length equal to an interior length of the truck bed. The shell has a interior bottom. Each bottom has a pair of front casters that are attached by a bracket along the interior bottom. The shell may include a slidable drawer within. The slidable drawer has a front face and a pair of sides. The front face has a pair of generally rectangular notches that are used as handles to pull the slidable drawer back and forth within the shell. The drawer slidable has a pair of rear casters attached. The slidable drawer is capable of sliding in and out of the shell by each rear caster bearing against the bottom, and each front caster bearing against the slidable drawer to allowing cantilever support for the slidable drawer. Included are a pair of tool box housings. Each tool box housing has a tool drawer positionable therein. One each of the tool box housings is interconnected to the bottom shell on opposites sides of the shell. Each tool drawer is capable of sliding back and forth within the respective tool box housing. Lastly, a center unit is positioned in the truck bed. The center unit has a floor portion with a pair of elongated tool bins positioned thereon. The floor portion extends the length of the truck bed and provides an upper closure for the bottom shell. Each tool bin is positioned over the wheel wells of the truck and has the floor portion as a tool bin base. Each tool bin is divided into three tool sectionals. Each sectional has a lid that is hingedly attached to the sectional. Each lid is opened to allow access to an inside area of the sectionals from the window of the side wall of the cover adjacent the respective bin.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved truck tool organizer system which has all of the advantages of the prior art truck bed tool box and none of the disadvantages.

It is another object of the present invention to provide a new and improved truck tool organizer system which may be easily and efficiently manufactured and marketed.

It is further object of the present invention to provide a new and improved truck tool organizer system which is of durable and reliable constructions.

An even further object of the present invention is to provide a new and improved truck tool organizer system which is susceptible of a low cost of manufacture with regard to both materials and labor, and which accordingly is then susceptible of low prices of sale to the consuming public, thereby making such truck tool organizer system economically available to the buying public.

Still yet another object of the present invention is to provide a new and improved truck tool organizer system which provides in the apparatuses and methods of the prior art some of the advantages thereof, while simultaneously overcoming some of the disadvantages normally associated therewith.

Even still another object of the present invention is to provide a truck tool organizer system for allowing a person in the construction business to transport and store tools in an organized fashion in the truck of a pickup truck, and further allowing the person to transport materials used in the building process on the truck bed cover.

Lastly, it is an object of the present invention to provide a new and improved truck tool organizer system including a truck bed cover that has a top planar portion with a pair of side projections, a front wall, a rear door and a pair of side walls. The rear door has a window centrally positioned therein and a turn handle that extends from a bottom end of the door. Each side wall has a window positioned within. Included is a bottom shell that is positioned within a truck bed and adjacent a pair of wheel wells. The shell has an interior bottom with a pair of front casters attached. The bottom is adjacent the bed of the truck bed. The shell receives a slidable drawer. Lastly, included is a center unit. The center unit is positioned in the truck bed and has a floor portion with a pair of tool bins. Each tool bin is positioned above the wheel well of the truck bed with the floor portion as a tool bin base.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a side view of the present invention showing the operable components of the drawer.

FIG. 6 is a cut-away view of the locking mechanism of the three side windows of the present invention taken at position 6 of FIG. 2.

FIG. 7 is a sectional view of the operable components of the turn handle of the rear door taken at position 7 of FIG. 3.

The same reference numerals refer to the same parts through the various Figures.

DESCRIPTION OF THE PREFERRED EMBODIMENT

Figure 1:
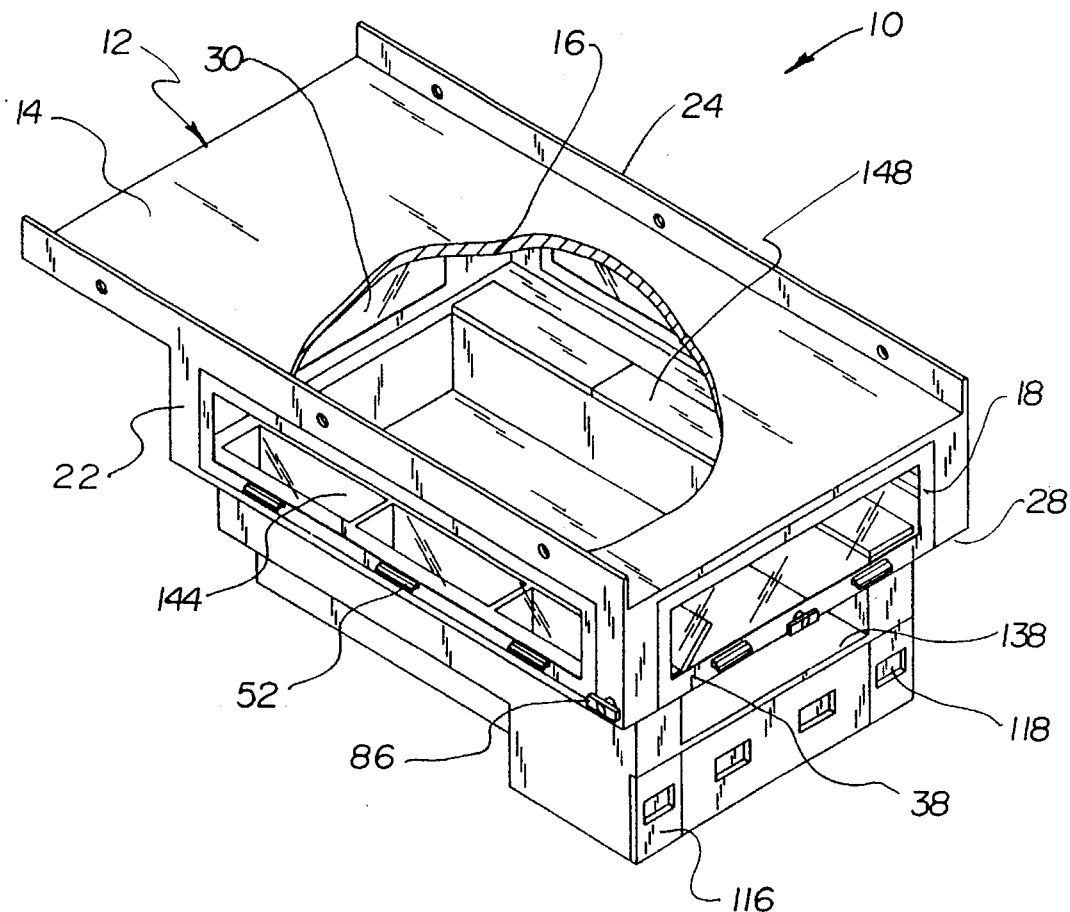
FIG. 1 is an isometric view of the preferred embodiment of the truck tool organizer system constructed in accordance with the principles of the present invention.

With reference now to the drawings, and in particular to FIG. 1 thereof, the preferred embodiment of the new and improved truck tool organizer system embodying the principles and concepts of the present invention and generally designated by the reference numeral 10 will be described.

The present invention, the truck tool organizer system 10 is comprised of a plurality of components. Such components in their broadest context include a truck bed cover, a bottom shell, and a center unit. Such components are individually configured and correlated with respect to each other so as to attain the desired objective.

Figure 2:
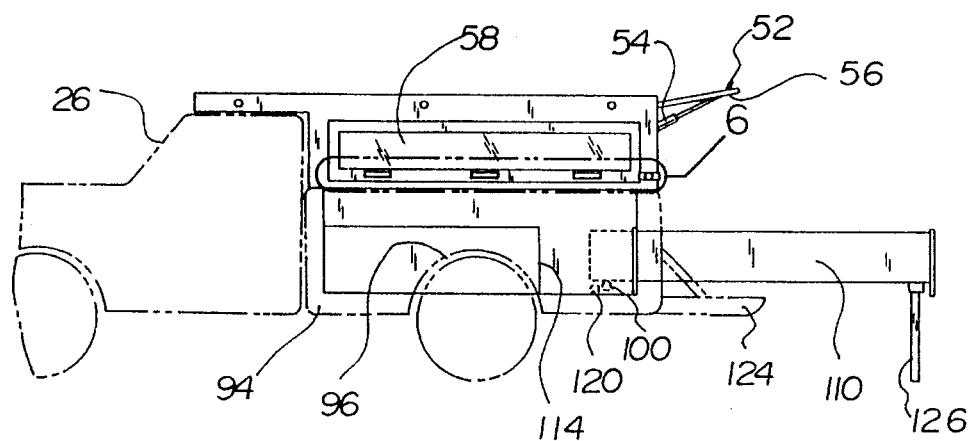
FIG. 2 is a side view of the present invention in an operable configuration.

Specifically, the present invention includes a generally rectangular truck bed cover 12. The truck bed cover is formed by a top planar portion 14, a front wall 16, a rear door 18, and a pair of side walls 22. As shown in FIG. 1, the top planar portion has a pair of side projections 24 that extend upwardly from the side walls of the truck bed cover. The top planar portion extends over the cab portion of a pickup truck 26. The top planar portion, of FIG. 2, is capable of receiving elongated planks or the like thereon. Also, as shown in FIG. 1, the cover has a base 28 that may be attached to the side of the pickup truck 26 with bolts, welding, or the like. The cover is made of metal or metal alloy, preferably steel. The cover is coated with fiberglass that may be colored to match the pickup truck.

Figure 3:
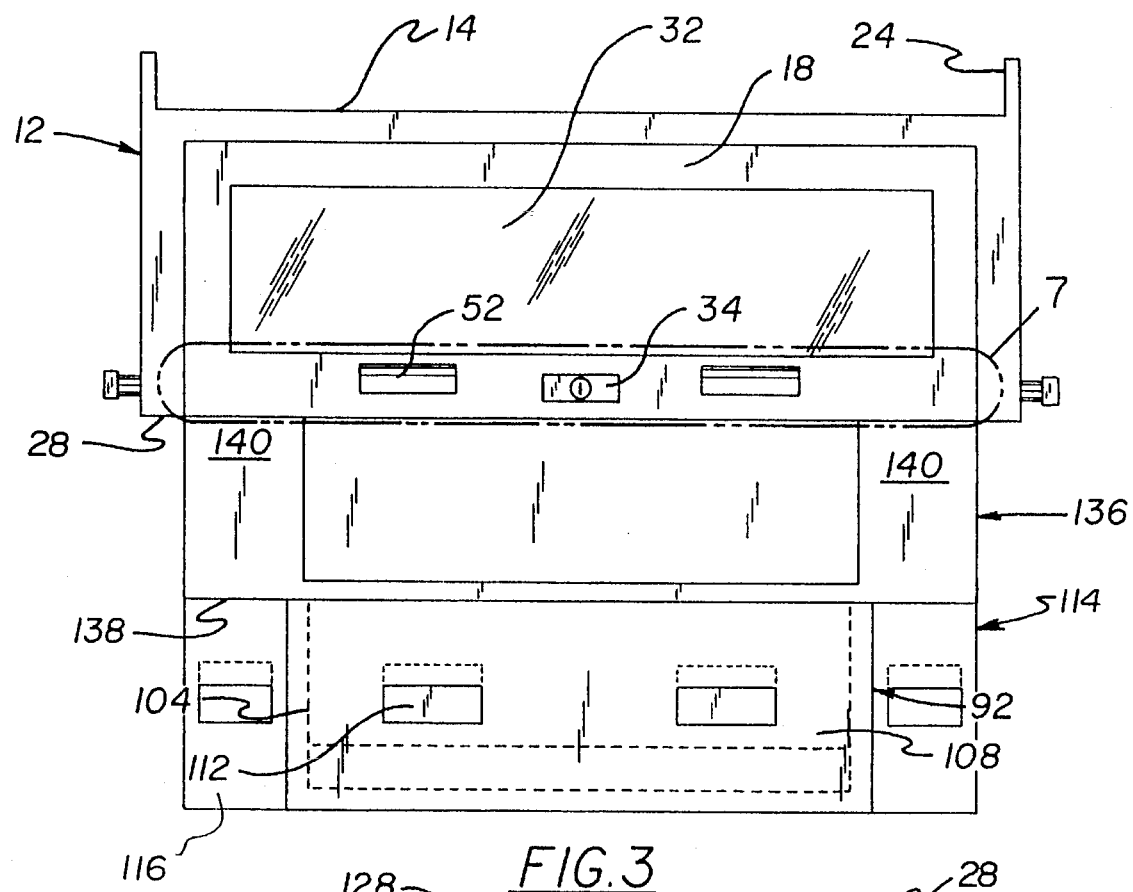
FIG. 3 is a perspective view of the present invention taken at the rear of the pickup truck.

The front wall 16 has a window 30. The rear door 18 has a window 32 centrally positioned, as shown in FIG. 3. Also, the rear door has a turn handle 34 that extends outwardly from a bottom end 38 of the door. As best illustrated in FIG. 7, the turn handle is attached to a locking mechanism 42. The locking mechanism has a pair of locking rods 44 that are housed within the door and extend into the side walls 22 of the cover. Each locking rod has a link 46 that allows it to coupled to a plate 48 of the turn handle.

When the handle is turned vertical each locking rod link rotates in a clockwise direction to pull the locking rod toward the plate and out of the side walls of the cover. When the turn handle is turned counter-clockwise to be in an identical plane with the locking rods, the links force the locking rods back out into the side walls of the cover. By using the turn handle, the rear door of the truck bed cover may be locked in a closed position.

The rear door has a pair of lift handles 52. The lift handles, as shown in FIG. 3, are proportionally spaced along the bottom end 38 of the door. The rear door is opened by lifting up on the lift handles after the turn handle is rotated vertical the locking rod. The door remains open with a hydraulic mechanism 54 that is attached to an interior side 56 of the door and cover 12. An illustration of the door opened is shown in FIG. 2. Each side wall has a window 58. Each window of the side wall has three lift handles 52, just like the lift handles of the rear door, for opening. The window of each side wall has a support rod 62 for holding the window in the open position.

Figure 9:
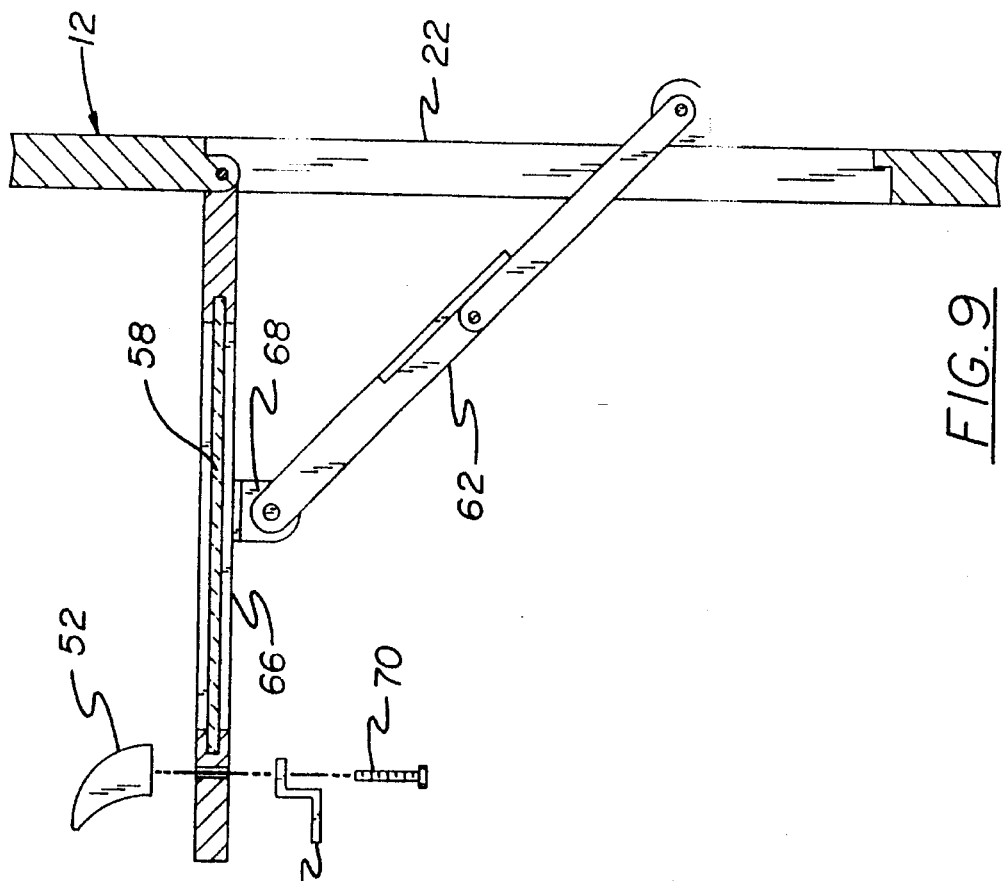
FIG. 9 is a side cross sectional view of a window of the side wall of the present invention.

FIG. 9 shows the operation of the window of each side wall. The support rod is attached to the window frame 66 with a bracket 68, and attached to the cover with a bracket. The lift handle 52 of each side wall window, and the rear door window are secured by a bolt 70 and a washer 72 passing through a bottom end.

As best illustrated in FIG. 6, a window locking mechanism 76 is included. The window locking mechanism is comprised of an elongated rod having three L-shaped projections 80 extending up from the rod 78. The elongated rod is attached to a lower portion of each side wall of the cover with a plurality of brackets 82. Each bracket allows movement of the rod within. At a rear end of the rod is a link 84. The link is attached to a window lock handle 86. As shown in FIG. 1, the window lock handle extends from the side wall of the cover near the rear door 18.

The window lock handle may be turned clockwise and counter-clockwise to cause the link to pull against the rod. When the link pulls the rod, the L-shaped projections move in and out of a locking bracket 88. The locking bracket is attached to the frame 66, of each window on the side walls. The turn handle is turned to lock the window of the side wall in a closed position.

Figure 4:
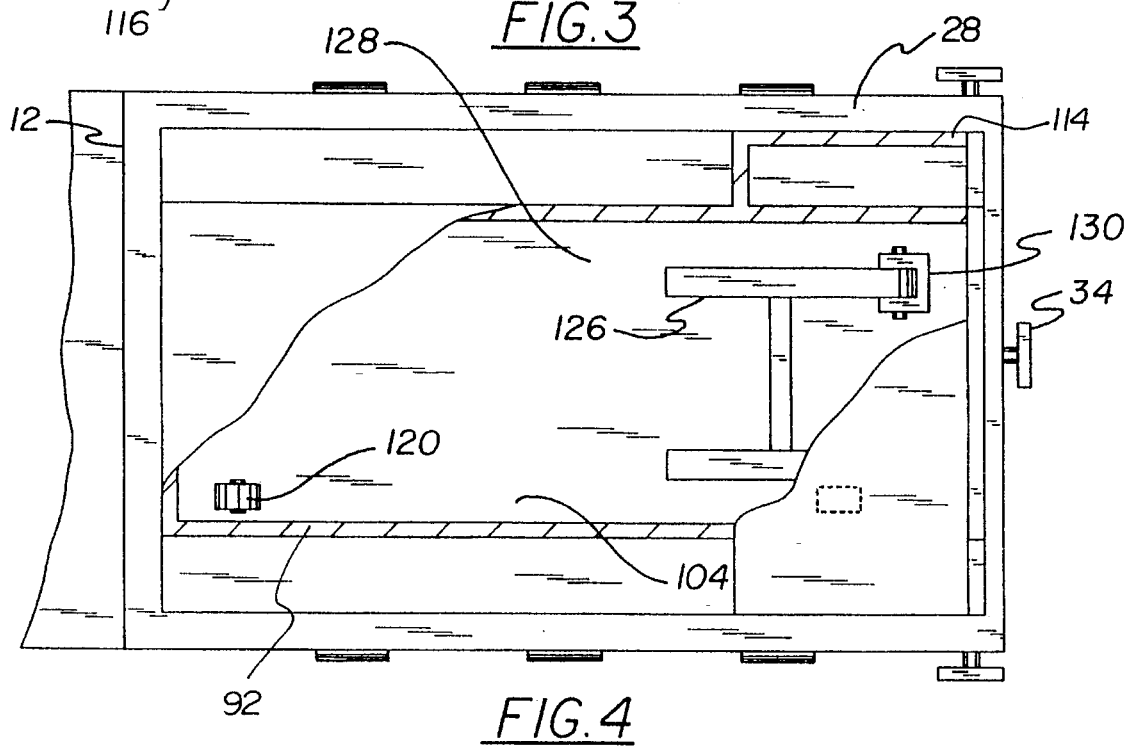
FIG. 4 is a bottom view of the present invention sectionally showing the bottom of the drawer.

Also, a generally rectangular bottom shell 92, as shown in FIGS. 3 and 4, is included. The bottom shell is positioned within a truck bed 94 and adjacent a pair of wheel wells 96 of the truck 26. Each wheel well extends upwardly a distance into the truck bed. The shell has a height that is equal to the distance of each wheel well as the well extends upward into the truck bed. The shell if formed of metal or metal alloy, and has a length that is equal to an interior length of the truck bed.

The shell has a interior bottom 98, as shown in FIG. 5, that rests adjacent the bed of the truck bed. Each bottom has a pair of front casters 100 that are attached, by a bracket 102, to the interior bottom. The shell 92 receives a slidable drawer 104, as shown in FIG. 2. The drawer is formed of a light weight aluminum and has a front face 108 and a pair of sides 110. The front face has a pair of generally rectangular notches 112 for use as handles to pull the drawer back and forth out of the shell.

Figure 11:
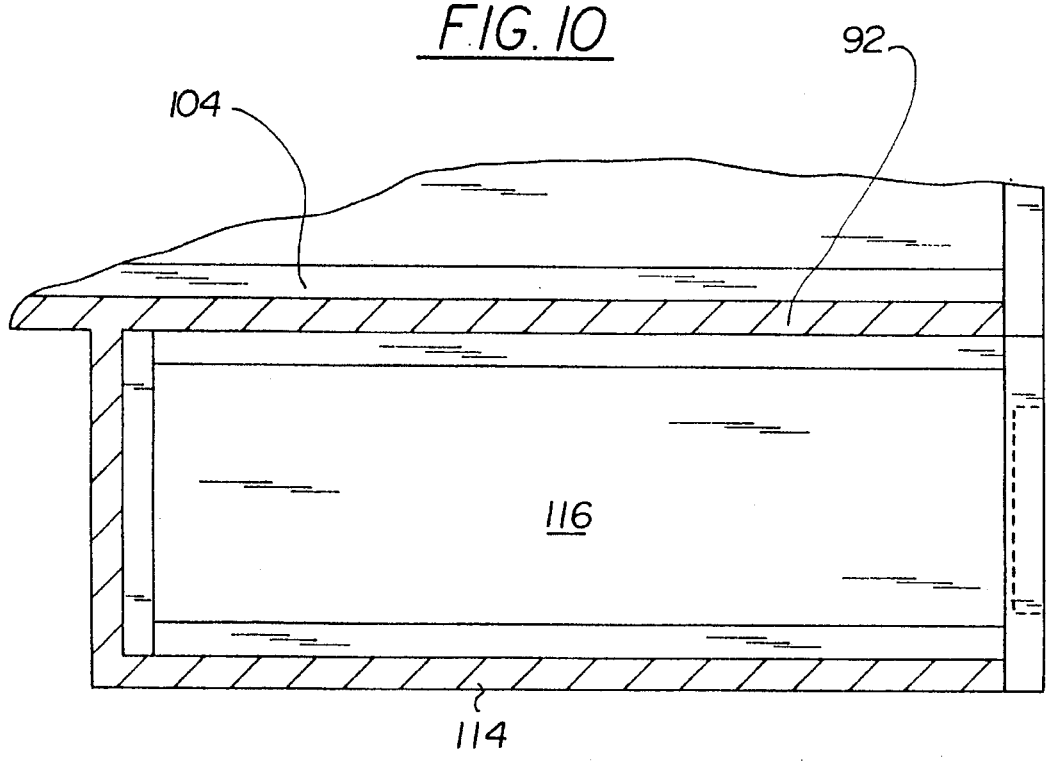
FIG. 11 is a top plane view of the tool box drawer in the tool box housing.

Additionally, a pair of tool box housings 114 are interconnected to the shell 92, as seen in FIG. 4. Each of the tool box housing being interconnected to the bottom shell on opposites sides of the shell. Each tool box housing extends from the rear of the cover to the wheel well 96, as seen in FIG. 2. Each tool box husing has a tool drawer 116, as seen in FIG. 11. Each tool drawer has a rectangular notch 118, formed identical to the notches 112 of the slidable drawer, but smaller in size. The notch functions as a handle that allows the tool drawer to be pulled back and forth within the tool box housing. The tool drawer is capable of having ropes, chains, jumper cables and other small items stored therein.

The slidable drawer has a pair of rear casters 120. Each caster is attached to the drawer with a bracket 122, as shown in FIG. 5. Each rear caster, when in a resting position, sits upon the interior bottom surface of the shell. The slidable drawer may be slid in and out of the shell by allowing each rear caster to bear against the interior bottom 98 of the shell 92, and each front caster bears against the slidable drawer to allow cantilever support for the slidable drawer. The slidable drawer 104 may be extended its entire length and pass beyond a tailgate 124 of the pickup truck 26.

When the slidable drawer is pulled beyond the tailgate of the truck, it is supported by an H-shaped support stand 126. Also, when the slidable drawer is pulled beyond the tailgate each front caster 100 and each rear caster 120 is positioned side by side and touching. The slidable drawer support stand is positioned on the ground when the slidable drawer extends beyond the tailgate. The slidable drawer support stand is folded and rests on the bottom surface 128 of the slidable drawer when the drawer is positioned within the shell. As shown in FIG. 4, the H-shaped support stand is attached to the bottom 128 of the slidable drawer with a bracket 130.

Figure 8:
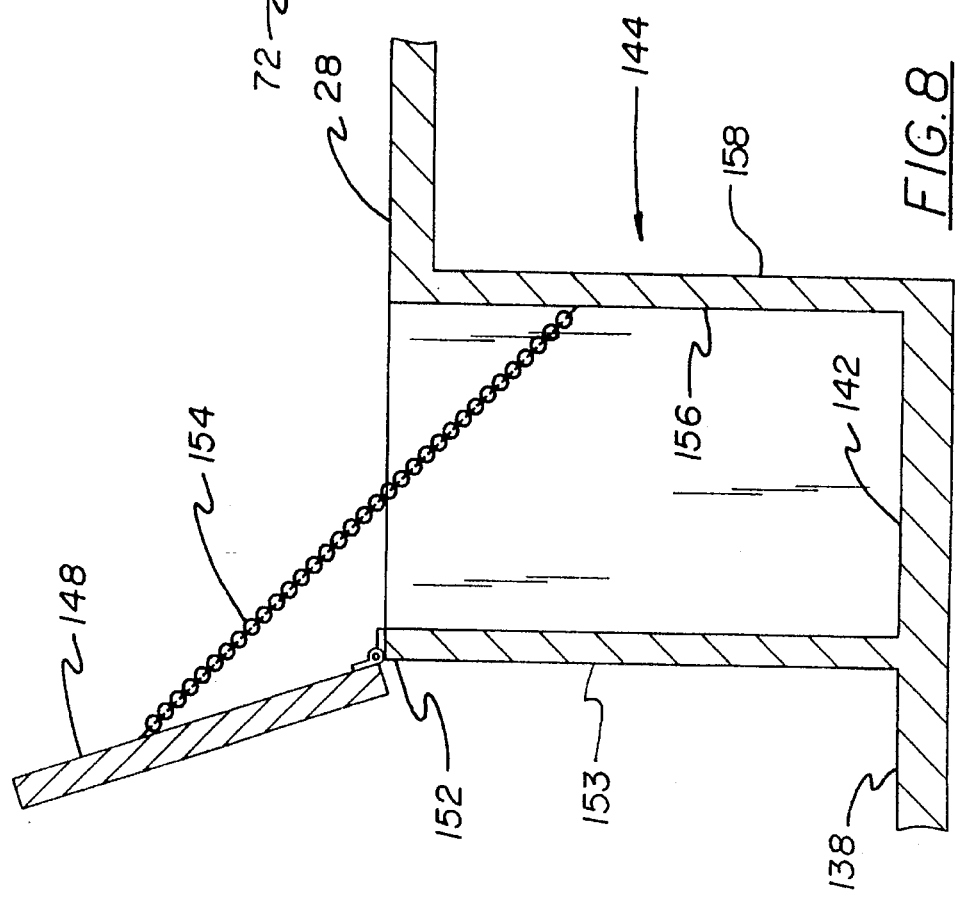
FIG. 8 is a side cross sectional view of a tool bin of the present invention.
Figure 10:
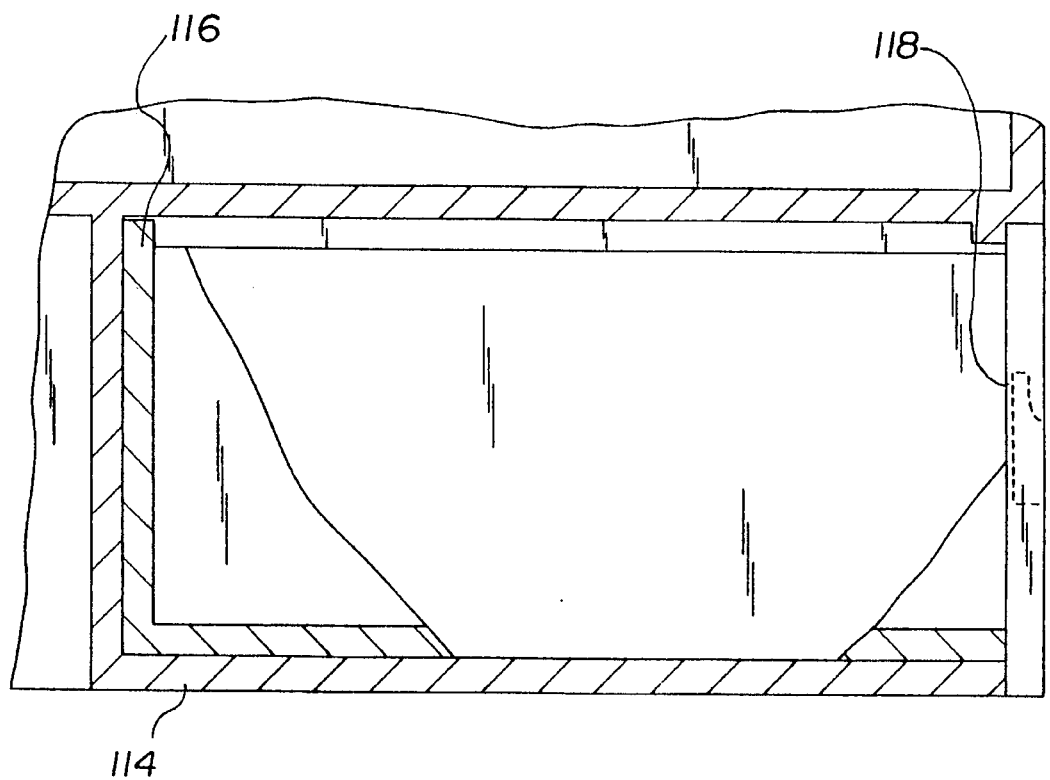
FIG. 10 is a cut-away side view of the tool box drawer of FIG. 1.

Lastly, a center unit 136 is provided. The center unit, of FIG. 3, is positioned in the truck bed 94. The center unit if formed of metal or metal alloy, preferably it is formed of steel. The center unit has a floor portion 138 with a pair of elongated tool bins 140 positioned thereon. The floor portion extends the length of the truck bed and provides an upper closure 138 for the bottom shell 92. Each tool bin is positioned above the wheel wells 96 of the truck bed 94 with the floor portion providing a tool bin base 142, as seen in FIG. 8.

Furthermore, as shown in FIG. 1, each tool bin is divided into three tool sectionals 144. Each sectional, as illustrated in FIG. 8, has a lid 148 that is hingedly attached to the sectional by a commercially available hinge 152. Each lid opens away from the window 58. When the lid is opened, it is prevented from falling back towards a rear wall 153 of the bin by a chain 154. The chain is secured to the lid at one end and to an interior side 156 of a front wall 158 of the sectional. Each lid, when open, allows access to an inside area of the sectional from the window of the side wall of the cover, when the window is opened. The user of the sectionals may access the sectional without having to enter the truck bed.

The truck bed cover, the bottom shell, and the center unit are all welded or bolted together forming the truck tool organizer system. In additional to allowing the material to be placed onto of the planar portion of the cover, the center unit provides spacing between the pair of tool bins, as shown in FIG. 1, which allow additional material to be stored in the tool organizer system. This system is designed to hold the tools securely within the truck bed and protect the tools from inclimate weather.

The present invention provides an easy to use truck bed cover for a pickup truck with a built-in material rack, slid-out tool box, sectional tool boxes, and an inside storing space. The present invention is most beneficial for persons in the construction business. It allows tools and materials to be stored within the truck bed and locked therein. Additionally, it allows elongated planks or similar type materials, necessary to do a particular job, to be placed on top of the cover in a planar portion. The truck tool organizer system is easy to use and provides a safe and secure place for storing tools and material without having to remove them each night after a job.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved truck tool organizer system for placement in a truck bed of a pickup truck comprising in combination:

a generally rectangular truck bed cover being formed by a top planar portion, a front wall, a rear door and a pair of side walls therebetween, the top planar portion having a pair of linear side projections integral therewith and extending vertically upwardly from the side walls of the truck bed cover, each side projection being contiguous the top planar portion and being extended to hang over a pickup truck cab member, the top planar portion capable of having elongated planks positioned thereon, the truck bed cover having a base for coupling with a pickup truck;

the front wall of the truck bed cover having a window therein, the rear door having a window centrally positioned therein and turn handle extending from a bottom end of the door, the door having a pair of lift handles proportionately spaced along the bottom end of the door, the door capable of being opened by lifting up on the lift handles, the door being capable of remaining opened with a hydraulic mechanism being attached to an interior side of the door and cover, each side wall having a window positioned therein, each window of each side wall having a plurality of lift handles for opening and a support rod for holding the window in the open position;

a generally rectangular bottom shell being fixedly attached to the truck bed cover, the bottom shell capable of being positioned within a truck bed adjacent a pair of wheel wells with the truck bed cover attached thereto, each wheel well extends upwardly a distance into the truck bed, the shell having a height equal to the distance each wheel well extends upward into the truck bed, the shell having a length equal to an interior length of the truck bed, the shell having an interior bottom, each bottom having a pair of front casters with each caster being attached by a bracket along each bottom;

the shell being in receipt of a slidable drawer, the slidable drawer having a front face and a pair of sides, the front face having a pair of generally rectangular notches for using as handles to pull the slidable drawer back and forth, the slidable drawer having a pair of rear casters attached, the slidable drawer capable of being slid in and out of the shell by each rear caster bearing against the respective interior bottom, and each front caster bearing against the slidable drawer to allow cantilever support for the slidable drawer, the slidable drawer capable of extending beyond a tailgate of the pickup truck when positioned within the bottom shell, the slidable drawer having an H-shaped support stand attached to a bottom surface thereof for balanced support of the slidable drawer when extended;

a pair of tool box housings with each tool box housing having a tool drawer positioned therein, one each of the tool box housings being interconnected to the bottom shell on opposites sides of the shell, each tool drawer being capable of sliding back and forth within the respective tool box housing;

a center unit being positioned in the truck bed and having a floor portion with a pair of elongated tool bins positioned thereon, the floor portion extending the length of the truck bed and providing an upper closure for the bottom shell, each tool bin being positioned above the wheel wells of the truck bed and having the floor portion as a tool bin base, each tool bin being divided into three tool sectionals, the three sectionals of each tool bin having a common rear wall interconnected with the floor portion, the three tool sectionals of each tool bin having a common front wall interconnected to the base of the truck bed cover, each sectional having a lid being hingedly attached to the rear wall of the respective sectional, each lid being opened for allowing access to an inside area of the sectional from the window of the side wall of the cover being adjacent the respective bin; and whereby the truck bed cover, the bottom shell and the center unit being interconnected forming the truck tool organizer system, and the truck bed cover allowing material to be placed on the planar portion for transport while the bottom shell and the center unit hold a variety of tools.

\* \* \* \* \*